(12) United States Patent
Ginjpalli et al.

(10) Patent No.: US 7,450,503 B1
(45) Date of Patent: Nov. 11, 2008

(54) SYSTEM AND METHOD TO MULTICAST GUARANTEED AND BEST-EFFORT TRAFFIC IN A COMMUNICATIONS NETWORK

(75) Inventors: Hariprasada Rao Ginjpalli, Cupertino, CA (US); Kent Wayne Wendorf, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1116 days.

(21) Appl. No.: 10/330,615

(22) Filed: Dec. 24, 2002

(51) Int. Cl.
*H04L 12/28* (2006.01)
*H04L 12/66* (2006.01)

(52) U.S. Cl. .................... 370/230.1; 370/231; 370/232; 370/235; 370/356; 370/390; 370/395.21; 370/395.41; 370/400; 370/413

(58) Field of Classification Search ........................ None
See application file for complete search history.

(56) References Cited

U.S. PATENT DOCUMENTS

| | | | |
|---|---|---|---|
| 5,291,477 A * | 3/1994 | Liew ........................... | 370/238 |
| 5,898,687 A | 4/1999 | Harriman et al. | |
| 5,905,871 A * | 5/1999 | Buskens et al. ............. | 709/245 |
| 5,991,298 A * | 11/1999 | Hunt et al. .................. | 370/390 |
| 6,009,078 A * | 12/1999 | Sato ............................ | 370/232 |
| 6,212,182 B1 | 4/2001 | McKeown | |
| 6,625,131 B1 * | 9/2003 | Yee-Madera et al. ........ | 370/325 |
| 6,724,761 B1 | 4/2004 | Moy-yee et al. | |
| 6,865,388 B2 * | 3/2005 | Walsh et al. ................. | 455/428 |
| 6,947,418 B2 * | 9/2005 | Boura et al. ................. | 370/390 |
| 7,085,269 B2 * | 8/2006 | Sano ........................... | 370/390 |
| 7,110,405 B2 * | 9/2006 | Divivier ...................... | 370/390 |
| 7,151,744 B2 * | 12/2006 | Sarkinen et al. ............. | 370/230 |

* cited by examiner

*Primary Examiner*—Melanie Jagannathan
(74) *Attorney, Agent, or Firm*—Blakely, Sokoloff, Taylor & Zafman LLP (57) ABSTRACT

A system and method to multicast guaranteed and best-effort traffic in a communications network are disclosed. According to one embodiment, incoming traffic is separated into unicast traffic and multicast traffic. Each root cell of the multicast traffic is classified based on multiple corresponding classes of service. Each root cell is then stored into a root cell buffer of multiple root cell buffers within an egress memory, each root cell buffer being associated with a corresponding class of service. According to one embodiment, each root cell is retrieved from the corresponding root cell buffer within the egress memory according to the associated class of service. Each root cell is then stored in a corresponding replication queue of multiple replication queues based on its associated class of service, with predetermined replication parameters assigned to each replication queue. Each root cell is subsequently replicated according to one or more associated replication parameters to obtain multiple leaf cells for each replicated root cell. According to one embodiment, the unicast traffic is multiplexed with the replicated leaf cells of the multicast traffic to obtain egress arrival cells. Each egress arrival cell is then stored hierarchically into a queuing buffer of multiple queuing buffers within a queuing memory according to queuing parameters corresponding to each egress arrival cell.

36 Claims, 6 Drawing Sheets

SYSTEM AND METHOD TO MULTICAST GUARANTEED AND BEST-EFFORT TRAFFIC IN A COMMUNICATIONS NETWORK

FIELD OF THE INVENTION

The present invention relates generally to a digital communications network. More particularly, the present invention relates to a system and method to multicast guaranteed and best-effort traffic in the digital communications network.

BACKGROUND OF THE INVENTION

A digital network comprises of a group of nodes that are connected to each other through a variety or interfaces. The network can also be logically considered to comprise several layers including, for example, a physical layer, a data link layer, a network layer, and a transport layer. In each of these layers, different agreed upon standards that enable various vendor equipment to communicate may be used. The standards are also known as communications protocols.

Asynchronous Transfer Mode ("ATM") or "cell switching" is a technology designed for transmitting digital information such as voice, video, and data at high speeds through the digital network. In the ATM protocol, the digital information to be transferred is first arranged into equal sized units called cells having fixed lengths. The cells are then transmitted from node to node until they reach a destination node through a pathway (or connection) within the digital network.

The communication path between two nodes is established through a virtual circuit. In a virtual circuit, the path may be established and then removed, and multiple virtual circuits may share resources along the path. When the data cells are sent through network switches that established virtual circuits through an automated call-setup procedure, the communication paths are called Switched Virtual Circuits ("SVCs").

The ATM Forum, which is a user and vendor group that establishes ATM standards, has defined several ATM class of service categories, used in characterization of virtual circuits, for example, (1) a Constant Bit Rate (CBR), which supports a constant or guaranteed rate to transport services, such as video or voice, as well as circuit emulation, which requires rigorous timing control and performance parameters; (2) a Variable Bit Rate (VBR), real time and non real time, which supports variable bit rate data traffic with average and peak traffic parameters; (3) an Available Bit Rate (ABR), which supports feedback to control the source rate in response to changed characteristics in the digital network; and (4) an Unspecified Bit Rate (UBR). Each class of service category has different guaranteed bandwidth requirements, delay, jitter, and cell loss parameters. Some class of service categories, such as, for example, ABR or UBR, rely mostly on best-effort service.

The digital network is constructed of digital switches coupled together through digital communication links such as, for example, trunks. The trunks carry the cells of information between the digital switches along the connection. The digital switches route the cells from incoming communication links to outgoing communication links and finally to the destination node.

In an ATM network, multicasting of cells has become an important function of the digital switches and it typically leads to efficient use of the network bandwidth. One method to multicast the traffic transmitted through a network node occurs at the egress unit level and involves input replication of the cells prior to queuing. An alternate method uses output replication of the cells subsequent to queuing of the cells. However, these methods can cause head of line blocking of the guaranteed traffic, such as CBR traffic, excessive delay due to congestion in a port, indiscriminate discarding operations at arrival due to queue build-ups and blocking.

SUMMARY OF THE INVENTION

A system and method to multicast guaranteed and best-effort traffic in a communications network are disclosed. According to one embodiment, incoming traffic is separated into unicast traffic and multicast traffic. Each root cell of the multicast traffic is classified based on multiple corresponding classes of service. Each root cell is then stored into a root cell buffer of multiple root cell buffers within an egress memory, each root cell buffer being associated with a corresponding class of service. According to one embodiment, each root cell is retrieved from the corresponding root cell buffer within the egress memory according to the associated class of service. Each root cell is then stored in a corresponding replication queue of multiple replication queues based on its associated class of service, with predetermined replication parameters assigned to each replication queue. Each root cell is subsequently replicated according to one or more associated replication parameters to obtain multiple leaf cells for each replicated root cell. According to one embodiment, the unicast traffic is multiplexed with the replicated leaf cells of the multicast traffic to obtain egress arrival cells. Each egress arrival cell is then stored hierarchically into a queuing buffer of multiple queuing buffers within a queuing memory according to queuing parameters corresponding to each egress arrival cell.

Other features and advantages of the present invention will be apparent from the accompanying drawings and from the detailed description, which follows below.

BRIEF DESCRIPTION OF THE DRAWINGS

The present invention is illustrated by way of example and not limitation in the figures of the accompanying drawings in which like references indicate similar elements and in which.

DETAILED DESCRIPTION

According to embodiments described herein, a system and method to multicast guaranteed and best-effort traffic in a communications network are disclosed.

As will be described in more detail below, according to one embodiment, incoming traffic is separated into unicast traffic and multicast traffic. Each root cell of the multicast traffic is classified based on multiple corresponding classes of service. Each root cell is then stored into a root cell buffer of multiple root cell buffers within an egress memory, each root cell buffer being associated with a corresponding class of service. According to one embodiment, each root cell is retrieved from the corresponding root cell buffer within the egress memory according to the associated classes of service. Each root cell is then stored in a corresponding replication queue of multiple replication queues based on its associated class of service, with predetermined replication parameters assigned to each replication queue. Each root cell is subsequently replicated according to one or more associated replication parameters to obtain multiple leaf cells for each replicated root cell. According to one embodiment, the unicast traffic is multiplexed with the replicated leaf cells of the multicast traffic to obtain egress arrival cells. Egress arrival cells, which include multiplexed leaf cells and unicast cells are then stored hierarchically into a queuing buffer of multiple queuing buffers within a queuing memory according to queuing parameters corresponding to each egress arrival cell.

Figure 1:
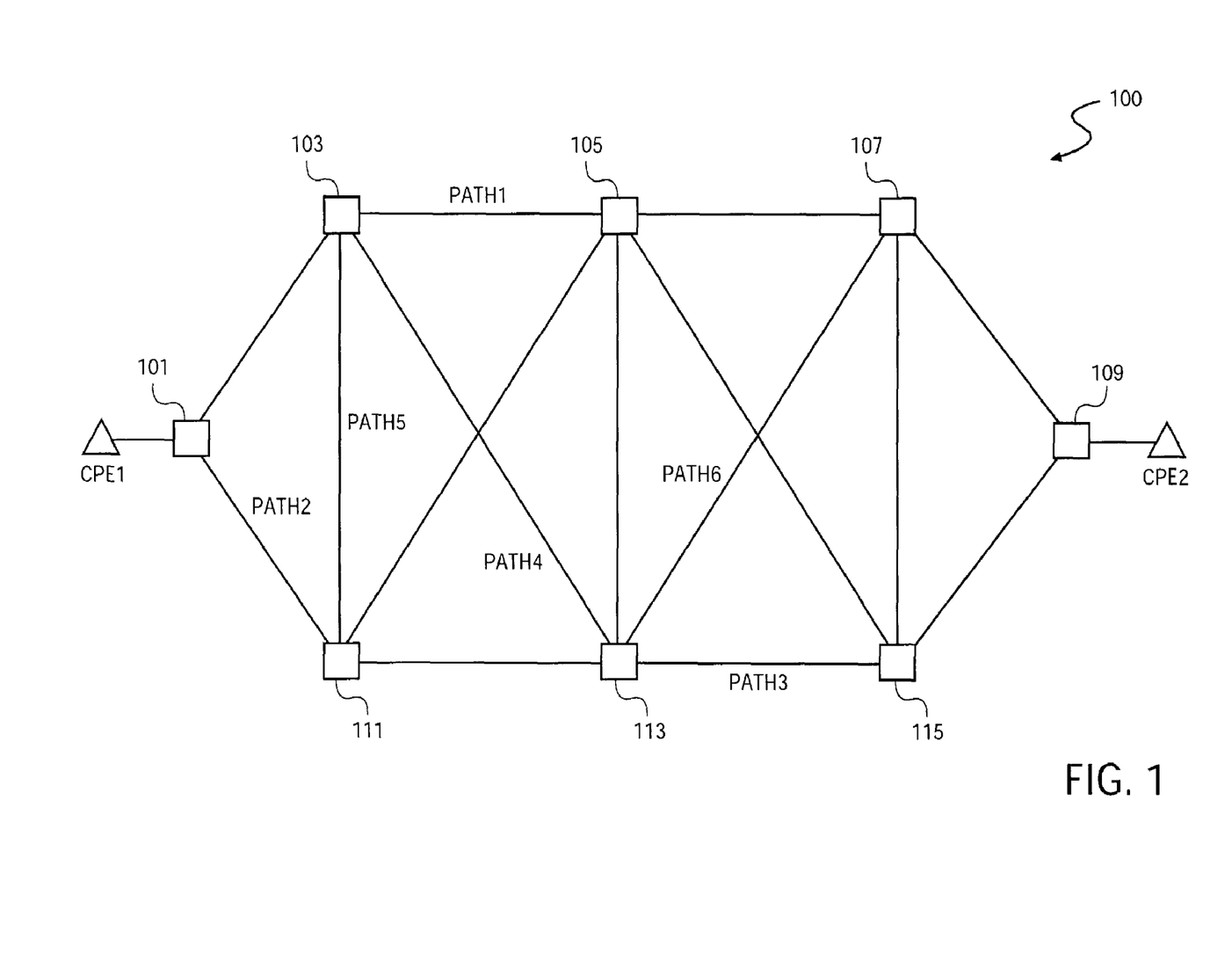
FIG. 1 is an exemplary diagram of a digital communications network environment that includes a plurality of trunks and in which embodiments of the present invention can be implemented.

FIG. 1 illustrates an exemplary diagram of a digital communications network environment that includes a plurality of trunks and in which embodiments of the present invention can be implemented. Referring to FIG. 1, the digital network environment 100 includes a plurality of nodes such as, for example, network switches 101, 103, 105, 107, 109, 111, 113, and 115, which are interconnected through a plurality of trunks. The trunks support the digital network 100 by transferring data, for example, from a starting client CPE1 connected to a starting node 101 to an ending client CPE2 connected to a destination node 109.

The digital network environment 100 may include a variety of networks, such as an asynchronous transfer mode ("ATM") network, a virtual private network ("VPN"), or a combination of virtual private networks and non-virtual private networks. The network 100 includes a plurality of clients coupled with each other through network 100. Client 1 (CPE1) and client 2 (CPE2) can each be a workstation, computer, server, or other similar device, for example.

The plurality of network nodes 101, 103, 106, 107, 109, 111, 113, and 115 are interconnected through a plurality of paths, such as Path 1 through Path 6. A path is a connection between nodes, clients, or end users. A path can include a plurality of paths for connecting any number of nodes within the digital network 100 for transferring data from CPE1 to CPE2. For one embodiment, the path is chosen to be the best route available between clients, such as CPE1 and CPE2, for making a connection at the time a communication request is placed.

Each node in a path is linked to all its neighboring nodes and to all other nodes in the network through the neighboring nodes. A node has a capability of receiving data, processing data, and passing data along to another node. A decision is made at each node to route received data to another node. For example, node 105 may receive data from node 103 and pass the data along to any selected neighborhood node, such as node 111, 113, 115, or 107.

Each node in the path of the cell is an ATM switch coupled to a trunk. The trunks coupled to each ATM switch in the cell path may either be of the same size or a different size. For example, node 103 may be an ATM switch coupled to an OC12 trunk and the node 105 may be an ATM switch coupled to an OC48 trunk.

A plurality of links or trunks may exist between any two nodes in the digital network 100. The plurality of links aid in exchange of data between any two nodes by allowing transportation of cells on the links. The links may be of any form, such as a cable wire, fiber optic line, an RF connection, or a satellite connection. The plurality of links between any two nodes allows multiple communications between the two nodes at any one time.

One type of communication between CPE1 and CPE 2 is a call that uses standards-based signaling, such as Private Network-to-Network Interface ("PNNI") and User-Network Interface ("UNI") signaling. The PNNI protocol is a dynamic routing protocol that provides Quality of Service ("QoS") routing support to signaling based on QoS requirements specified in the communication request.

Figure 2:
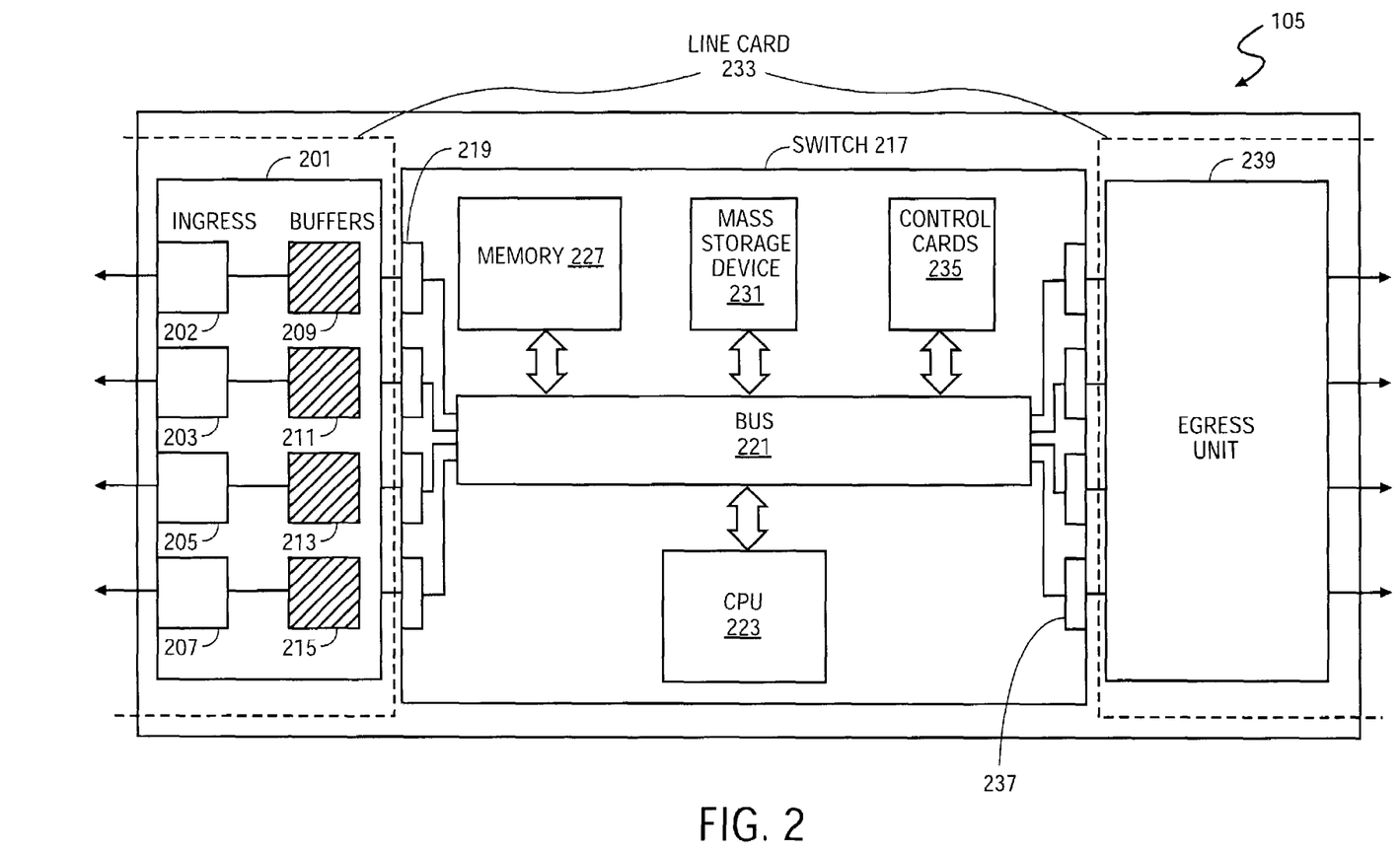
FIG. 2 illustrates a network node capable of receiving, processing, and outputting data, according to one embodiment of the present invention.

FIG. 2 illustrates a network node 105 capable of receiving, processing, and outputting data, according to one embodiment of the present invention. Network node 105 shown in FIG. 2 is similar to the other network nodes within the network 100.

Network node 105 includes an ingress unit 201, a switch 217, and an egress unit 239. For one embodiment, a network node 105 may include a plurality of line cards, which contain a respective ingress unit and a respective egress unit. Ingress unit 201 may be coupled to input data links for receiving data from another network node via a trunk coupled to the node. Ingress unit 201 may include ingress input areas 202-207, and buffering units 209-215 coupled to the ingress areas 202-207 for buffering the received data from the input links. Ingress unit 201 may be coupled to switch 217 for transferring the buffered data to the switch 217.

Switch 217 is an ATM switch. Alternatively, other types of switches may also be used. ATM switch 217 is coupled to a variety of trunks—for example, OC48, OC12, or DS3 trunks.

Switch 217 includes a digital processing system for processing data received by and to be sent by the network node. The digital processing system includes a bus 221 coupled to a plurality of input and output ports 219 and 237, a central processing unit ("CPU") 223, a memory 227, a mass storage device 231, and a plurality of control cards 235.

For one embodiment, bus 221 is a standard system bus. CPU 223 can be used to process information for the switch 217.

Memory 227 can comprise dynamic random access memory ("DRAM") static random access memory ("SRAM"), read-only memory ("ROM"), or other storage devices, for storing data or program codes used by CPU 223. For example, memory 227 may store a topology database containing topology information corresponding to other network nodes 105 within the network 100, as described in further detail below. Memory 227 may also store temporary variables or other intermediate information during execution of instructions by CPU 223. Mass storage device 231 can be a hard disk drive a floppy disk drive, an optical disk drive, or other mass storage device for storing information or instructions for the switch 217.

For one embodiment, the network node 105 may contain one or more line cards 233 and several control cards 235 that control the line card 233 via bus 221. For one embodiment, the line card 233 is coupled to multiple input ports 219 and multiple output ports 237 via bus 221, of which four respective ports 219 and 237 are shown in FIG. 2. Alternatively, the line card 233 may be coupled to eight, sixteen, or more ports 219 and 237. Each port may support a specific data bit rate. User traffic may be received through one line card and transmitted through another. This cross-connection is determined by a control card 235 upon the establishment of a connection. Typically, each line card also contains a hardware module (not shown) to accomplish bit-level and cell-level functions (such as recombining, quality of service, etc.) and a software module (not shown) for reprogramming hardware upon changing connections. The control cards 235 may typically run the various protocols, such as the ATM protocol, for example, and may contain datagrams for encapsulating resource configuration information. Alternatively, such software may be implemented elsewhere within the switch 217 or external to the switch 217 within the network node 105. Bus 221, CPU 223, memory 227, mass storage device 231, one or more line cards 233, and control cards 235 communicate to process data packets received from input ports 219.

An egress unit 239 is coupled to switch 217. The egress unit 239 is coupled to output data links and data is communicated from these output data links to a node designated by the switch 217. At the switch 217, data is received from the ingress unit 201 and a decision is made to route the data to a particular node. Further functions such as, for example, the quality of service ("QoS"), may also be determined by switch 217. One embodiment of the egress unit 239 will be described in further detail below in connection with FIG. 3.

Figure 3:
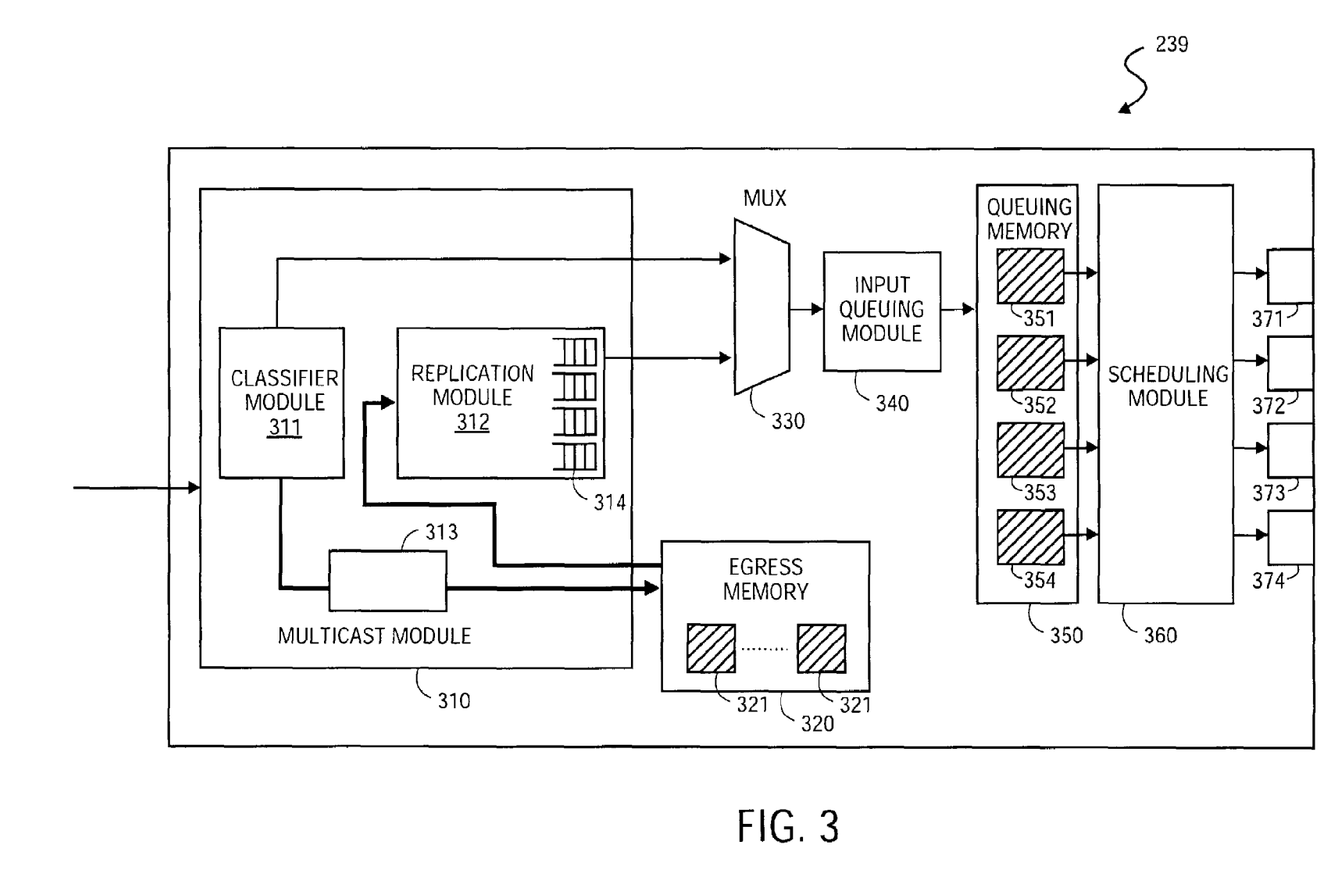
FIG. 3 illustrates an egress unit within the network node, according to one embodiment of the present invention.

FIG. 3 illustrates an egress unit 239 within the network node, according to one embodiment of the present invention. As shown in FIG. 3, the egress unit 239 includes a multicast module 310, an egress memory 320 coupled to the multicast module 310, a multiplexer 330 coupled to the multicast module 310, an input queuing module 340 coupled to the multiplexer 330, a queuing memory 350 coupled to the input queuing module 340, a scheduling module 360 coupled to the queuing memory 350, and a number of egress ports coupled to the scheduling module 360, of which ports 371 through 374 are shown in FIG. 3.

For one embodiment, the multicast module 310 receives the incoming traffic from a source node within the network 100. The multicast module 310 is a programmable hardware and/or software module to perform the operations described herein, which further includes a classifier module 311, a replication module 312, and an input thresholding block 313 coupled to the classifier module 311.

For one embodiment, the classifier module 311 is a programmable hardware and/or software module to perform separation and classification operations described herein. The classifier module 311 receives the incoming traffic, analyzes each incoming cell, and separates the incoming traffic into unicast traffic and multicast traffic. The multicast traffic contains root cells of mixed traffic, either guaranteed traffic, such as, for example, CBR or VBR traffic, or non-guaranteed (best-effort) traffic, such as, for example, ABR or UBR traffic.

The classifier module 311 further transmits the unicast traffic to the input queuing module 340 via the multiplexer 330. The root cells within the multicast traffic are further classified based on corresponding classes of service assigned to each root cell. The classifier module 311 further transmits each root cell to the egress memory 320 via the input thresholding module 313.

For one embodiment, the egress memory 320, such as, for example, a static random access memory SRAM, further includes multiple root cell buffers 321, each root cell buffer 321 corresponding to a class of service of the multiple classes of service assigned to the incoming root cells. The egress memory 320 receives the root cells transmitted by the classifier module 311 and stores each root cell into the root cell buffer 321 corresponding to the class of service of the particular root cell.

For one embodiment, the input thresholding module 313 is a programmable hardware and/or software module to perform comparison, thresholding, and discarding operations described herein. The input thresholding module 313 continuously compares a current root cell count of each root cell buffer 321 to a predetermined threshold level to determine any potential overflow. If the current root cell count reaches the predetermined threshold level, the root cells arriving at the input thresholding module 313 are discarded according to one of many known thresholding techniques, such as, for example, an Early Packet Discarding ("EPD") technique, wherein entire packets of root cells are subsequently discarded, or a Partial Packet Discarding ("PPD") technique, which allows the discarding of partial packets, or any one of a number of other known thresholding techniques.

For one embodiment, the replication module 312 within the multicast module 310 is a programmable hardware and/or software module for performing retrieval, storing, and replication operations described herein. The replication module 312 further includes multiple replication queues 314. Multiple predetermined parameters are assigned to each replication queue 314 to allow storage of the root cells to be replicated, such as, for example, a guaranteed cell rate within each class of service, which is the minimum rate of replication in the respective replication queue 314, a priority parameter indicating a degree of sensitivity to cell delay variation, and an excess weight parameter to control allocation of excess bandwidth.

For one embodiment, the replication module 312 retrieves the root cells from the respective root cell buffer 321 according to the associated classes of service and stores each root cell in a replication queue 314 based on the assigned guaranteed rate, priority parameter, and excess weight parameter of the replication queue 314. Each guaranteed replication queue 314 contains root cells of guaranteed traffic and each non-guaranteed replication queue 314 contains root cells of best-effort traffic.

For one embodiment, the replication module 312 further replicates root cells of guaranteed traffic from the guaranteed replication queues 314 according to one or more replication parameters associated to each root cell connection, indicating, for example, a predetermined multiple of leaf cells to be replicated from the respective root cell. After the guaranteed traffic is replicated, the replication module 312 distributes the excess bandwidth to the non-guaranteed replication queues 314 and further replicates root cells of best-effort traffic according to respective associated replication parameters.

For one embodiment, the replication module 312 further transmits the replicated leaf cells to the multiplexer 330 and drops each root cell subsequent to its replication. Once replicated, all the leaf cells are multiplexed with the unicast traffic received from the classifier module 311 to obtain egress arrival cells. The multiplexer 330 transmits the multiplexed leaf and unicast cells to the input queuing module 340 where the multiplexed leaf and unicast cells are treated in an equal manner.

For one embodiment, the input queuing module 340 is a programmable hardware and/or software module to perform storage operations described herein. The input queuing module 340 hierarchically stores each egress arrival cell into a queuing buffer within the queuing memory 350, of which queuing buffers 351-354 are shown, according to multiple queuing parameters of the respective egress arrival cell, such as, for example, a corresponding egress port 371-374, a class of service associated with the egress arrival cell, and a virtual connection associated with the arrival cell.

For one embodiment, the scheduling module 360 is a programmable hardware and/or software module to perform scheduling operations described herein. Once the leaf cells are stored within respective queuing buffers 351-354, the scheduling module 360 schedules departure of leaf cells along with the unicast cells to destination nodes according to the corresponding queuing parameters assigned to each queuing buffer 351-354.

Figure 4:
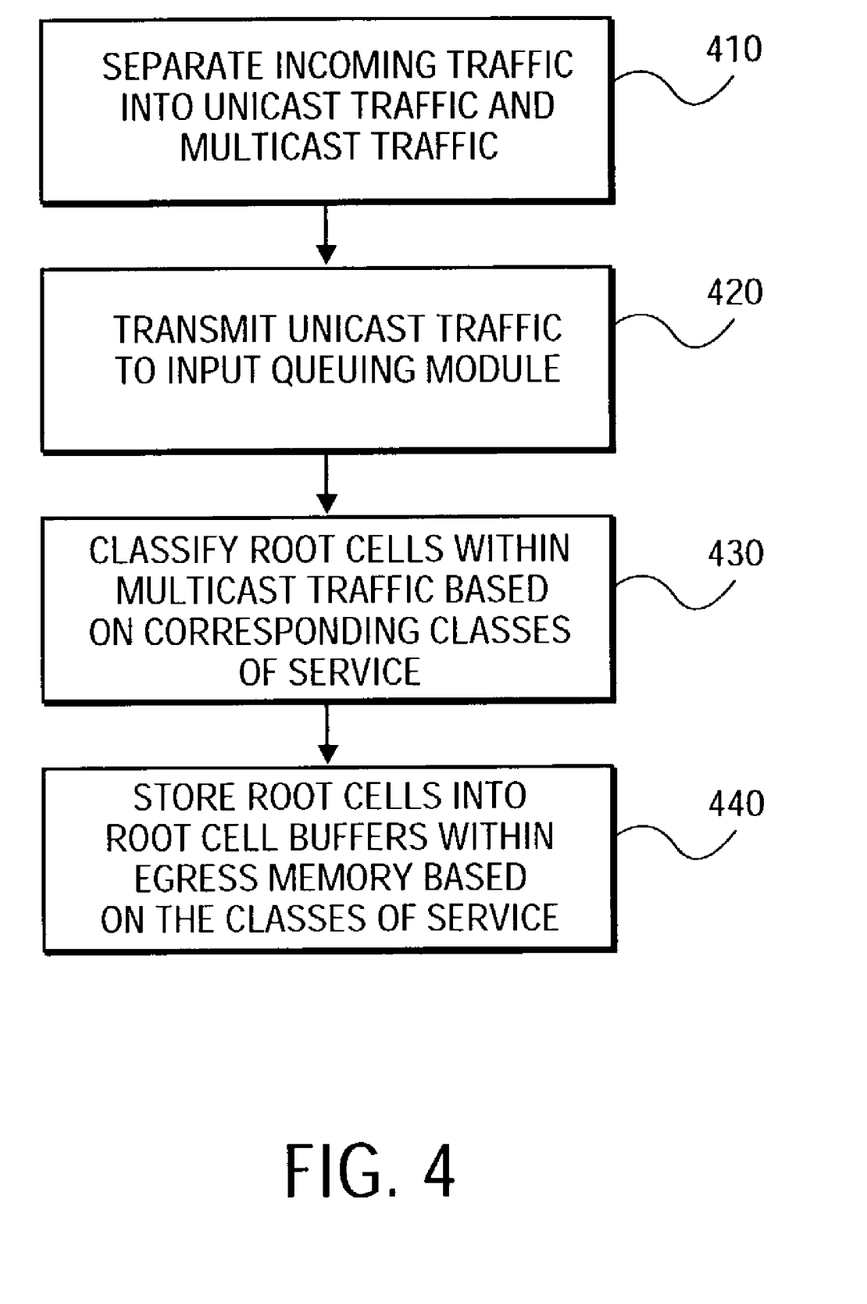
FIG. 4 illustrates a method to store incoming traffic in an egress memory within the egress unit, according to one embodiment of the present invention.

FIG. 4 illustrates a method to store incoming traffic in an egress memory within the egress unit, according to one embodiment of the present invention. Referring to FIG. 4, at processing block 410, incoming traffic is separated into unicast traffic and multicast traffic. At processing block 420, the unicast traffic is transmitted to the input queuing module 340.

At processing block 430, the root cells within the multicast traffic are classified based on corresponding classes of service. At processing block 440, the root cells are stored into root cell buffers 321 within the egress memory 320 based on the classes of service.

Figure 5:
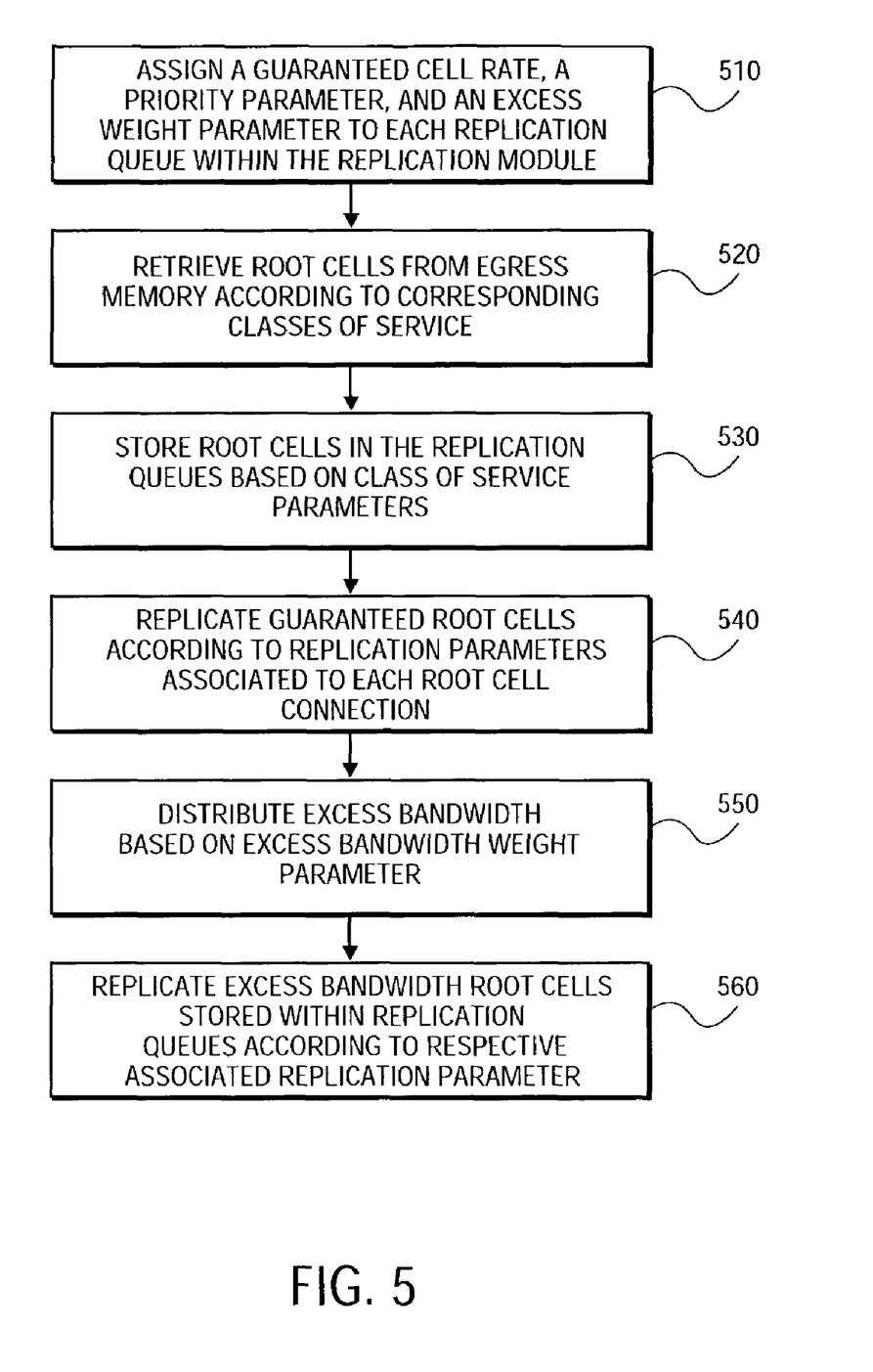
FIG. 5 illustrates a method to multicast guaranteed and best-effort traffic in a communications network, according to one embodiment of the present invention.

FIG. 5 illustrates a method to multicast guaranteed and best-effort traffic in a communications network, according to one embodiment of the present invention. Referring to FIG. 5, at processing block 510, a guaranteed cell rate, a priority parameter, and an excess weight parameter are assigned to each replication queue 314 within the replication module 312.

At processing block 520, root cells are retrieved from the egress memory 320 according to corresponding classes of service. At processing block 530, the root cells are stored in the replication queues 314 based on the class of service parameters.

At processing block 540, guaranteed root cells are replicated first according to replication parameters associated to each root cell connection. At processing block 550, subsequent to the service of the guaranteed bandwidth, excess bandwidth is distributed to replication queues 314 based on excess bandwidth weight. Finally, at processing block 560, excess bandwidth root cells stored in the best-effort replication queues 314 are replicated according to respective associated replication parameters.

Figure 6:
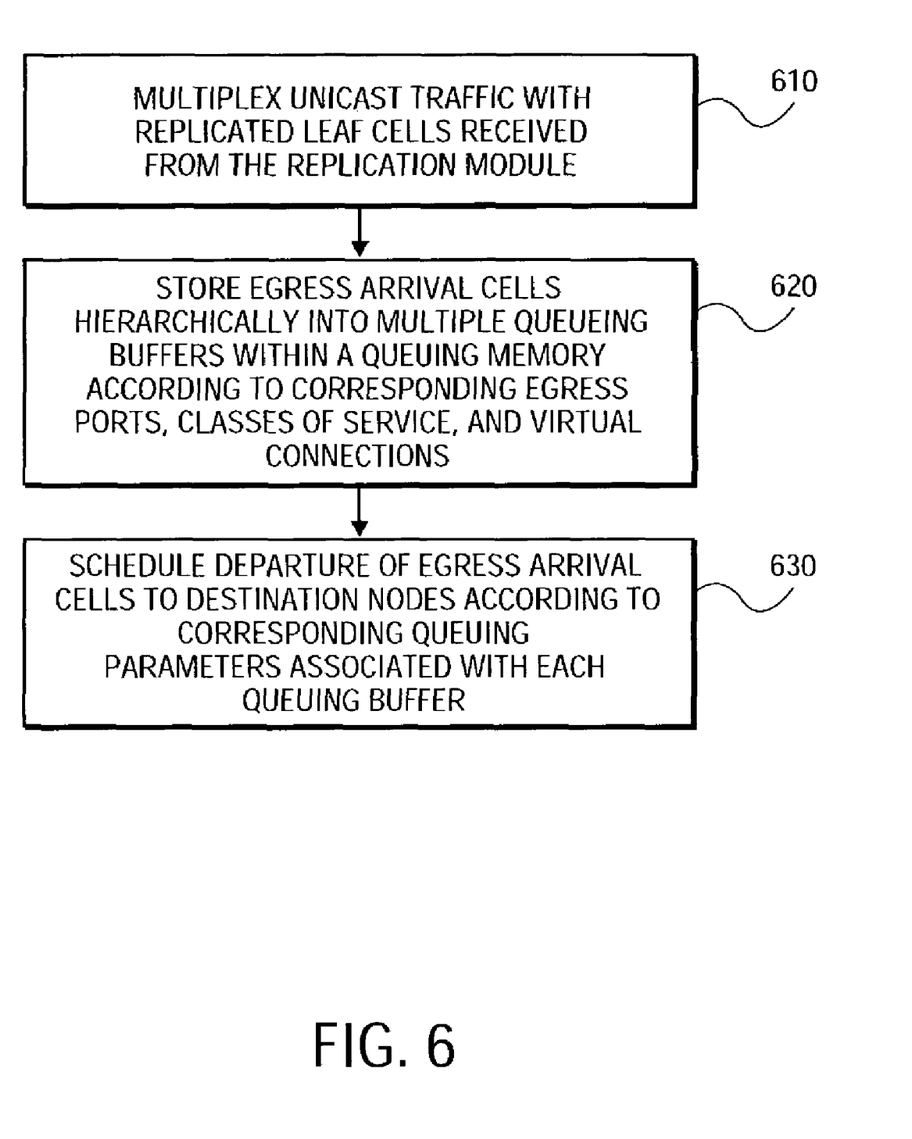
FIG. 6 illustrates a method to schedule departure of outgoing traffic to a destination node in a communications network, according to one embodiment of the present invention.

FIG. 6 illustrates a method to schedule departure of outgoing traffic to a destination node in a communications network, according to one embodiment of the present invention. Referring to FIG. 6, at processing block 610, unicast traffic is multiplexed with replicated leaf cells received from the replication module 312 to obtain egress arrival cells. At processing block 620, egress arrival cells are stored hierarchically into multiple queuing buffers 351-354 within a queuing memory 350 according to corresponding egress ports, classes of service, and virtual connections. Finally, at processing block 630, the departure of egress arrival cells to destination nodes is scheduled according to the corresponding queuing parameters associated with each queuing buffer 351-354.

Thus, a system and method to multicast guaranteed and best-effort traffic in a communications network have been disclosed. Embodiments of the present invention may be implemented in software programs executed on some form of a processing core (such as a central processing unit of a microprocessor or microcontroller) or otherwise implemented or realized upon or within a machine-readable or computer readable medium. A machine-readable medium includes any mechanism for storing or transmitting information in a form readable by a machine (e.g., a computer or a switch). For example, a machine readable medium includes read-only memory ("ROM"); random-access memory ("RAM"); magnetic disk storage media; optical storage media; flash memory devices; electrical, optical, acoustical, or other form of propagated signals (i.e., carrier waves, infrared signals, digital signals, etc.); or any other type of media suitable to store or to transmit information.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. In a connection-oriented networking environment, a method comprising:
    separating incoming traffic into unicast traffic and multicast traffic;
    classifying each root cell of said separated multicast traffic based on a plurality of corresponding classes of service;
    storing said each root cell into a root cell buffer of a plurality of root cell buffers, each root cell buffer of said plurality of root cell buffers being associated with a corresponding class of service of said plurality of classes of service;
    transferring said each root cell from said root cell buffer according to said associated class of service to a corresponding replication queue of a plurality of replication queues, each of said plurality of replication queues being assigned a plurality of predetermined parameters including a guaranteed cell rate within said associated class of service that indicates a minimum rate of replication in said corresponding replication queue and a priority parameter that indicates a degree of sensitivity to cell delay variation;
    replicating said each root cell according to said plurality of predetermined parameters assigned to said each replication queue to obtain a plurality of leaf cells for said each replicated root cell; and
    combining said separated unicast traffic and said plurality of replicated leaf cells using a multiplexer to obtain a plurality of egress arrival cells.

2. The method according to claim 1, wherein said connection-oriented network is an asynchronous transfer mode (ATM) network.

3. The method according to claim 1, further comprising transmitting said plurality of egress arrival cells directly to an input queuing module.

4. In a connection-oriented networking environment, a method comprising:
    separating incoming traffic into unicast traffic and multicast traffic;
    replicating each root cell of said separated multicast traffic according to a plurality of predetermined parameters assigned to said each replication queue to obtain a plurality of leaf cells for said each replicated root cell, said plurality of predetermined parameters including a guaranteed cell rate that indicates a minimum rate of replication and a priority parameter that indicates a degree of sensitivity to cell delay variation;
    combining said unicast traffic and said plurality of replicated leaf cells of said multicast traffic received from a replication module using a multiplexer to obtain a plurality of egress arrival cells; and
    transmitting said plurality of egress arrival cells directly to an input queuing module that stores each egress arrival cell hierarchically into a queuing buffer of a plurality of queuing buffers within a queuing memory according to a plurality of queuing parameters corresponding to said each egress arrival cell.

5. The method according to claim 4, wherein said plurality of queuing parameters further comprises at least one corresponding egress port for said each egress arrival cell.

6. The method according to claim 4, wherein said plurality of queuing parameters further comprises at least one class of service associated with said each egress arrival cell.

7. The method according to claim 4, wherein said plurality of queuing parameters further comprises at least one virtual connection associated with said each egress arrival cell.

8. The method according to claim 4, further comprising:
scheduling departure of said each egress arrival cell to an assigned destination node according to corresponding class of service parameters associated with each queuing buffer of said plurality of queuing buffers.

9. A network system comprising:
means for separating incoming traffic into unicast traffic and multicast traffic;
means for classifying each root cell of said separated multicast traffic based on a plurality of corresponding classes of service;
means for storing said each root cell into a root cell buffer of a plurality of root cell buffers, each root cell buffer of said plurality of root cell buffers being associated with a corresponding class of service of said plurality of classes of service;
means for transferring said each root cell from said root cell buffer according to said associated class of service to a corresponding replication queue of a plurality of replication queues, each of said plurality of replication queues being assigned a plurality of predetermined parameters including a guaranteed cell rate within said associated class of service that indicates a minimum rate of replication in said corresponding replication queue and a priority parameter that indicates a degree of sensitivity to cell delay variation;
means for replicating said each root cell according to said plurality of predetermined parameters assigned to said each replication queue to obtain a plurality of leaf cells for said each replicated root cell; and
a multiplexer for combining said separated unicast traffic and said plurality of replicated leaf cells to obtain a plurality of egress arrival cells.

10. The network system according to claim 9, wherein said connection-oriented network is an asynchronous transfer mode (ATM) network.

11. The network system according to claim 9, further comprising means for transmitting said unicast traffic to an input queuing module.

12. A network system comprising:
means for separating incoming traffic into unicast traffic and multicast traffic;
means for replicating each root cell of said separated multicast traffic according to a plurality of predetermined parameters assigned to said each replication queue to obtain a plurality of leaf cells for said each replicated root cell, said plurality of predetermined parameters including a guaranteed cell rate that indicates a minimum rate of replication and a priority parameter that indicates a degree of sensitivity to cell delay variation;
a multiplexer for combining said unicast traffic and said plurality of replicated leaf cells of said multicast traffic received from a replication module to obtain a plurality of egress arrival cells; and
means for transmitting said plurality of egress arrival cells directly to an input queuing module that stores each egress arrival cell hierarchically into a queuing buffer of a plurality of queuing buffers within a queuing memory according to a plurality of queuing parameters corresponding to said each egress arrival cell.

13. The network system according to claim 12, further comprising:
means for scheduling departure of said each egress arrival cell to an assigned destination node according to corresponding class of service parameters associated with each queuing buffer of said plurality of queuing buffers.

14. A computer readable medium encoded with computer executable instructions, which, when executed in a processing system, cause said processing system to perform a method comprising:
separating incoming traffic into unicast traffic and multicast traffic;
classifying each root cell of said separated multicast traffic based on a plurality of corresponding classes of service;
storing said each root cell into a root cell buffer of a plurality of root cell buffers, each root cell buffer of said plurality of root cell buffers being associated with a corresponding class of service of said plurality of classes of service;
transferring said each root cell from said root cell buffer according to said associated class of service to a corresponding replication queue of a plurality of replication; queues, each of said plurality of replication queues being assigned a plurality of predetermined parameters including a guaranteed cell rate within said associated class of service that indicates a minimum rate of replication in said corresponding replication queue and a priority parameter that indicates a degree of sensitivity to cell delay variation;
replicating said each root cell according to said plurality of predetermined parameters assigned to said each replication queue to obtain a plurality of leaf cells for said each replicated root cell; and
combining said separated unicast traffic and said plurality of replicated leaf cells using a multiplexer to obtain a plurality of egress arrival cells.

15. The computer readable medium according to claim 14, wherein said method further comprises transmitting said plurality of egress arrival cells directly to an input queuing module.

16. A computer readable medium encoded with computer executable instructions, which, when executed in a processing system, cause said processing system to perform a method comprising:
separating incoming traffic into unicast traffic and multicast traffic;
replicating each root cell of said separated multicast traffic according to a plurality of predetermined parameters assigned to said each replication queue to obtain a plurality of leaf cells for said each replicated root cell, said plurality of predetermined parameters including a guaranteed cell rate that indicates a minimum rate of replication and a priority parameter that indicates a degree of sensitivity to cell delay variation;
combining said unicast traffic and said plurality of replicated leaf cells of said multicast traffic received from a replication module using a multiplexer to obtain a plurality of egress arrival cells; and
transmitting said plurality of egress arrival cells directly to an input queuing module that stores each egress arrival cell hierarchically into a queuing buffer of a plurality of queuing buffers within a queuing memory according to a plurality of queuing parameters corresponding to said each egress arrival cell.

17. The computer readable medium according to claim 16, wherein said method further comprises:
   scheduling departure of said each egress arrival cell to an assigned destination node according to corresponding class of service parameters associated with each queuing buffer of said plurality of queuing buffers.

18. A network node in a connection-oriented network, the network node comprising:
   a switch; and
   at least one line card coupled to said switch, said at least one line card to separate incoming traffic into unicast traffic and multicast traffic,
      to classify each root cell of said separated multicast traffic based on a plurality of corresponding classes of service,
      to store said each root cell into a root cell buffer of a plurality of root cell buffers, each root cell buffer of said plurality of root cell buffers being associated with a corresponding class of service of said plurality of classes of service,
      to transfer said each root cell from said root cell buffer according to said associated class of service to a corresponding replication queue of a plurality of replication queues, each of said plurality of replication queues being assigned a plurality of predetermined parameters including a guaranteed cell rate within said associated class of service that indicates a minimum rate of replication in said corresponding replication queue and a priority parameter that indicates a degree of sensitivity to cell delay variation,
      to replicate said each root cell according to said plurality of predetermined parameters assigned to said each replication queue to obtain a plurality of leaf cells for said each replicated root cell, and
      to combine said separated unicast traffic with said plurality of replicated leaf cells using a multiplexer to obtain a plurality of egress arrival cells.

19. The node according to claim 18, wherein said connection-oriented network is an asynchronous transfer mode (ATM) network.

20. The node according to claim 18, wherein said at least one line card further retrieves said each root cell from said corresponding root cell buffer according to a plurality of associated classes of service, stores said each root cell in a corresponding replication queue of a plurality of replication queues based on a plurality of predetermined parameters assigned to each replication queue, and replicates said each root cell according to at least one associated replication parameter to obtain a plurality of leaf cells for said each replicated root cell.

21. The node according to claim 20, wherein said at least one line card further distributes available excess bandwidth to said plurality of replication queues, and replicates said each root cell stored within said plurality of replication queues according to at least one associated replication parameter.

22. The node according to claim 20, wherein said at least one line card further compares a current root cell count within said corresponding root cell buffer with a predetermined threshold level for said root cell buffer, and discards incoming root cells if said current cell count reaches said predetermined threshold level.

23. The node according to claim 18, wherein said at least one line card further stores each egress arrival cell hierarchically into a queuing buffer of a plurality of queuing buffers within a queuing memory according to a plurality of queuing parameters corresponding to said each egress arrival cell.

24. The node according to claim 23, wherein said at least one line card further schedules departure of said each egress arrival cell to an assigned destination node according to corresponding class of service parameters associated with each queuing buffer of said plurality of queuing buffers.

25. In a network node within a connection-oriented network, a line card comprising:
   an egress memory;
   a classifier module coupled to said egress memory to separate incoming traffic into unicast traffic and multicast traffic,
      to classify each root cell of said separated multicast traffic based on a plurality of corresponding classes of service, and
      to store said each root cell into a root cell buffer of a plurality of root cell buffers within said egress memory, each root cell buffer of said plurality of root cell buffers being associated with a corresponding class of service of said plurality of classes of service;
   a replication module coupled to said egress memory
      to transfer said each root cell from said root cell buffer according to said associated class of service to a corresponding replication queue of a plurality of replication queues, each of said plurality of replication queues being assigned a plurality of predetermined parameters including a guaranteed cell rate within said associated class of service that indicates a minimum rate of replication in said corresponding replication queue and a priority parameter that indicates a degree of sensitivity to cell delay variation, and
      to replicate said each root cell according to said plurality of predetermined parameters assigned to said each replication queue to obtain a plurality of leaf cells for said each replicated root cell; and
   a multiplexer coupled to said classifier module to combine said separated unicast traffic and said plurality of replicated leaf cells received from said replication module to obtain a plurality of egress arrival cells.

26. The line card according to claim 25, wherein said connection-oriented network is an asynchronous transfer mode (ATM) network.

27. The line card according to claim 25, wherein said multiplexer further transmits said plurality of egress arrival cells directly to an input queuing module.

28. The line card according to claim 25, wherein said plurality of predetermined parameters comprises an excess weight parameter, which controls allocation of excess bandwidth.

29. The line card according to claim 25, wherein said at least one replication parameter indicates a predetermined multiple of said plurality of leaf cells to be replicated from said each root cell.

30. The line card according to claim 25, wherein said replication module further distributes available excess bandwidth to said plurality of replication queues, and replicates said each root cell stored within said plurality of replication queues according to at least one associated replication parameter.

31. The line card according to claim 25, further comprising an input thresholding module coupled to said egress memory to compare a current root cell count within said corresponding root cell buffer with a predetermined threshold level for said root cell buffer, and to discard incoming root cells if said current cell count reaches said predetermined threshold level.

32. The line card according to claim 25, further comprising:
  an input queuing module coupled to said multiplexer to store each egress arrival cell hierarchically into a queuing buffer of a plurality of queuing buffers within a queuing memory coupled to said input queuing module according to a plurality of queuing parameters corresponding to said each egress arrival cell.

33. The line card according to claim 32, wherein said plurality of queuing parameters further comprises at least one corresponding egress port for said each egress arrival cell.

34. The line card according to claim 32, wherein said plurality of queuing parameters further comprises at least one class of service associated with said each egress arrival cell.

35. The line card according to claim 32, wherein said plurality of queuing parameters further comprises at least one virtual connection associated with said each egress arrival cell.

36. The line card according to claim 32, further comprising a scheduling module coupled to said queuing memory to schedule departure of said each egress arrival cell to an assigned destination node according to corresponding class of service parameters associated with each queuing buffer of said plurality of queuing buffers.

* * * * *